Feb. 5, 1929.  F. P. MUEHLENBECK  1,701,241
GLASS LETTER PLATE
Filed May 3, 1928
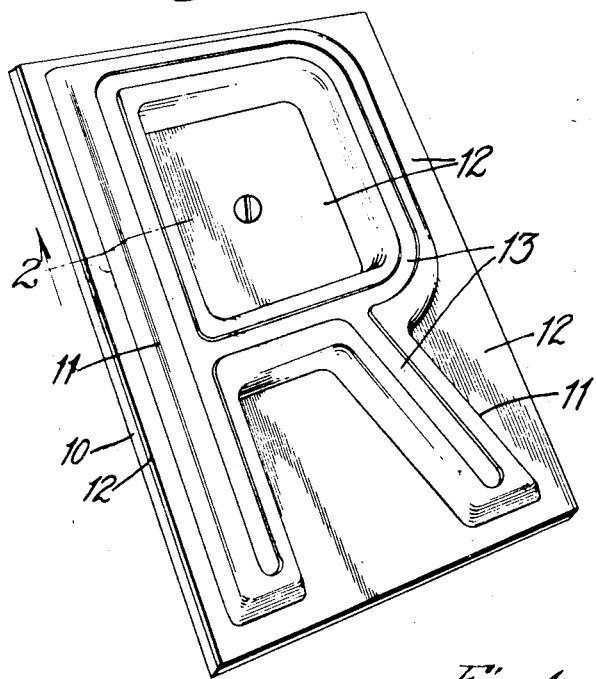
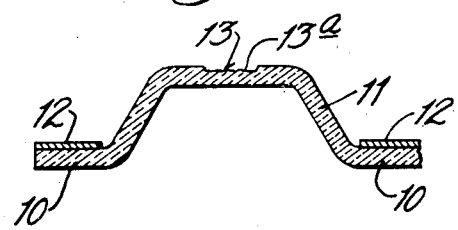
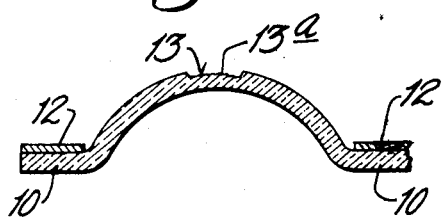
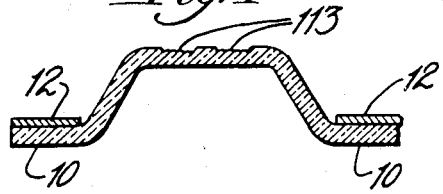
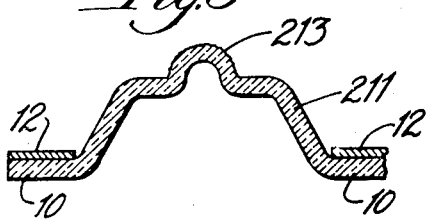
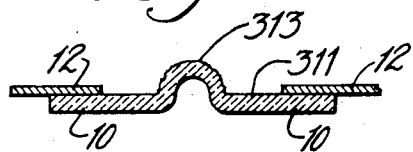
Inventor:
Fred P. Muehlenbeck,
By Dyrenforth, Lee, Chritton and Wiles,
Attys.

Patented Feb. 5, 1929.

1,701,241

UNITED STATES PATENT OFFICE.

FRED P. MUEHLENBECK, OF CHICAGO, ILLINOIS, ASSIGNOR TO OPALITE CORPORATION, OF CHICAGO, ILLINOIS, A CORPORATION OF ILLINOIS.

GLASS LETTER PLATE.

Application filed May 3, 1928. Serial No. 274,922.

This invention relates to improvements in glass letter plates, and more especially such a letter plate adapted for use in illuminated signs of well known construction which may be either single or double face. Such signs are of the kind that are illuminated at night from a source of light at the rear of the letter plate and which are made brilliant in daylight by light reflected from such plates.

The present invention is adapted for the production of any sign character including letters, figures, fanciful and imitative designs, and arbitrary marks, but for convenience of description the same is shown herein as applied to a letter plate with the letter "R".

One of the features of my invention is the making of such a letter plate with added beauty of design, which also reduces the glare and increases the visibility of the character.

In that form of device embodying the features of my invention shown in the accompanying drawing, Figure 1 is a view in perspective, Fig. 2 is a view taken as indicated by the line 2 of Fig. 1, and Figs. 3, 4, 5 and 6 are views showing modified forms.

As shown in the drawings, the letter plate in the preferred form comprises a substantially rectangular glass plate 10, preferably made out of opalite, milk-white, or translucent glass well known in the art. The face of this plate 10 carries the desired character, here shown as the letter "R", raised or in relief thereon. Such letter is indicated in general by 11.

The face of the plate 10, except where the strokes of the character occur, is covered by opaque stencil parts, indicated by 12.

The raised thick stroke 11 may be flattened on top, as shown in Fig. 2, or rounded as shown in the modified form illustrated in Fig. 3. Centrally imposed on the character stroke is a relatively narrower stroke of distinguishing color, as indicated by 13. For example, the narrow stroke 13 may be red, either transparent or translucent. I have found that the narrow stroke 13 may be well made by etching a depression in the glass by a sand blast. This leaves the bottom of the depression, as indicated by 13ª, slightly roughened so that a coating of red color or paint may be applied thereto to make the distinguishing color. The paint will adhere very well to the roughened surface made by a sand blast.

In the modified form shown in Fig. 4, there are two relatively narrow strokes of distinguishing color, as indicated by 113, which resemble the stroke 13 shown in the preferred form.

In the modified form shown in Fig. 5, the relatively narrow stroke instead of being depressed is raised, as indicated by 213, and the surface of this narrower raised portion centrally arranged on the top of the character stroke 211 is preferably roughened on its surface to cause a suitable color or paint to adhere to the same.

In the modified form shown in Fig. 6, the character stroke itself, as indicated by 311, instead of being raised is flat, and centrally arranged on this character stroke is a raised narrower stroke, as indicated by 313, which may be roughened and colored the same as the stroke 213 on the device shown in Fig. 5.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A glass letter plate of the character described having a plate portion and a sign character integral therewith, said sign character being raised with respect to the plate portion and being hollow and open at the back of the plate portion, said sign character being etched in outwardly spaced relation to the plate portion and bearing distinguishing coloring matter on the etched portion.

2. A letter plate of the character described having an opaque plate portion and a sign character, said sign character projecting outwardly beyond the plate portion and being hollow and open at the back of the plate portion, said sign character bearing inset distinguishing coloring matter thereon in outwardly spaced relation to the plate portion.

3. A letter plate of the character described having an opaque plate portion and a sign character, said sign character projecting outwardly beyond the plate portion and being hollow and open at the back of the plate portion, said sign character being etched and bearing distinguishing coloring matter on the etching in outwardly spaced relation to the plate portion, the wall forming said sign character being of substantially the same thickness as the plate portion.

4. A glass letter plate of the character described having a plate portion and a sign character integral therewith, said sign character being raised with respect to the plate portion and being hollow and open at the back of the plate portion, said sign character bearing distinguishing coloring matter thereon inset with respect to the outer surface of the sign character.

5. A glass letter plate of the character described having a plate portion and a sign character integral therewith, said sign character being hollow and open at the back of the plate portion and being of a greater width than the thickness of the plate portion, said sign character bearing inset distinguishing coloring matter in outwardly spaced relation to the sign character, said sign character being translucent.

6. A glass letter plate of the character described having a plate portion and a sign character integral therewith, said sign character being hollow and open at the back of the plate portion, the hollow being of greater depth than the thickness of the plate portion, said sign character bearing inset distinguishing coloring matter in outwardly spaced relation to the sign character, said sign character being translucent.

7. A glass letter plate of the character described having a plate portion and an integral sign character thereon, the wall of the plate portion and sign character being relatively thin throughout the wall of the sign character being translucent, said sign character being hollow and projecting outwardly from the plate portion and being open at the rear thereof, said sign character being relatively wide and the hollow being of a greater depth than the thickness of the plate portion, and inset coloring matter carried by the sign character in outwardly spaced relation to the plate portion.

8. A letter plate of the character described having a plate portion provided with an opaque stencil, a translucent character extending from the plate portion outwardly beyond the stencil to an extent greater than the thickness of the plate portion, said sign character being hollow and open at the rear of the plate portion, the outer raised surface of the sign character being etched and bearing coloring matter.

In witness whereof, I have hereunto set my hand, this 26th day of April, 1928.

FRED P. MUEHLENBECK.